United States Patent [19]

Nash

[11] 3,800,530

[45] Apr. 2, 1974

[54] AIR COOLED AUGMENTER IGNITER ASSEMBLY

[75] Inventor: Dudley O. Nash, Cincinnati, Ohio

[73] Assignee: General Electric Company, Cincinnati, Ohio

[22] Filed: Feb. 17, 1972

[21] Appl. No.: 227,109

[52] U.S. Cl............ 60/261, 60/39.74 R, 60/39.82 S, 60/262
[51] Int. Cl.......... F02c 3/04, F02c 7/22, F02c 7/26
[58] Field of Search......... 60/261, 39.82 S, 39.72 R, 60/39.74 R, 39.82 P, 39.82 R, 39.66, 39.67

[56] References Cited
UNITED STATES PATENTS

| | | | |
|---|---|---|---|
| 3,487,636 | 1/1970 | Vdoviak et al. | 60/39.82 S |
| 2,831,993 | 4/1958 | Lentz | 60/39.82 S UX |
| 2,651,178 | 9/1953 | Williams | 60/261 X |

FOREIGN PATENTS OR APPLICATIONS

| | | | |
|---|---|---|---|
| 588,847 | 6/1947 | Great Britain | 60/39.74 |

Primary Examiner—Carlton R. Croyle
Assistant Examiner—Robert E. Garrett
Attorney, Agent, or Firm—Thomas J. Bird, Jr.; Derek P. Lawrence

[57] ABSTRACT

An augmenter igniter assembly for a mixed flow augmenter gas turbine engine is shown to include an airfoil-shaped, hollow housing which surrounds an electrical discharge-type igniter and provides a cooling air flowpath therearound. A high velocity, cooling air flowpath is provided in the region of the critical igniter tip, and antiflameholding air is ejected from the downstream end of the housing to locally cool this region and to reduce the wake downstream of the housing. Mounting means are shown which permit removal of the igniter and its associated electrical lead without the necessity of removing the housing from the engine casing. The mounting means also spring-loads the igniter tip into its desired position at the base of the housing and further provides means for allowing selective movement of the housing with respect to other augmenter components during augmenter operation.

16 Claims, 6 Drawing Figures

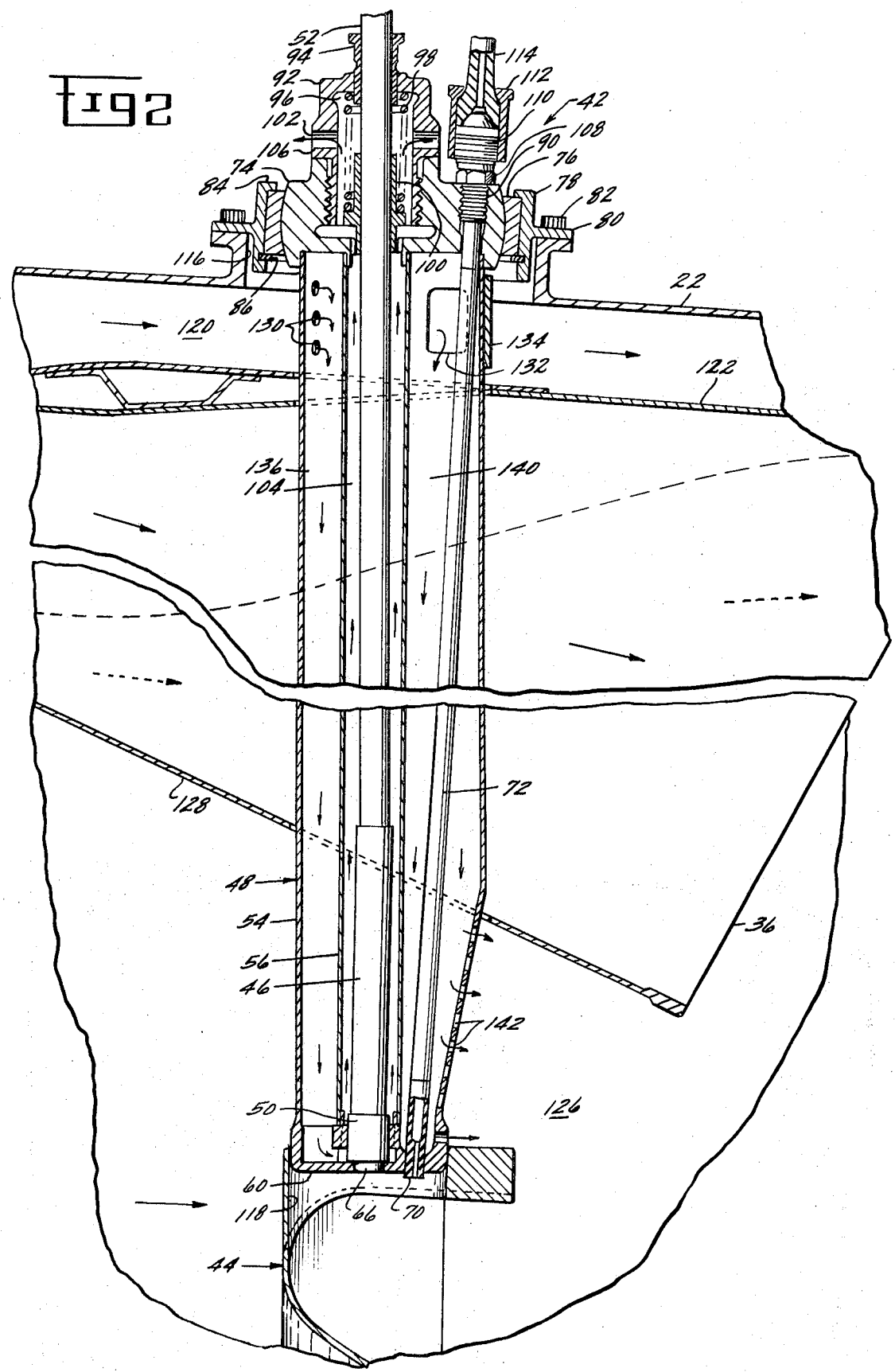

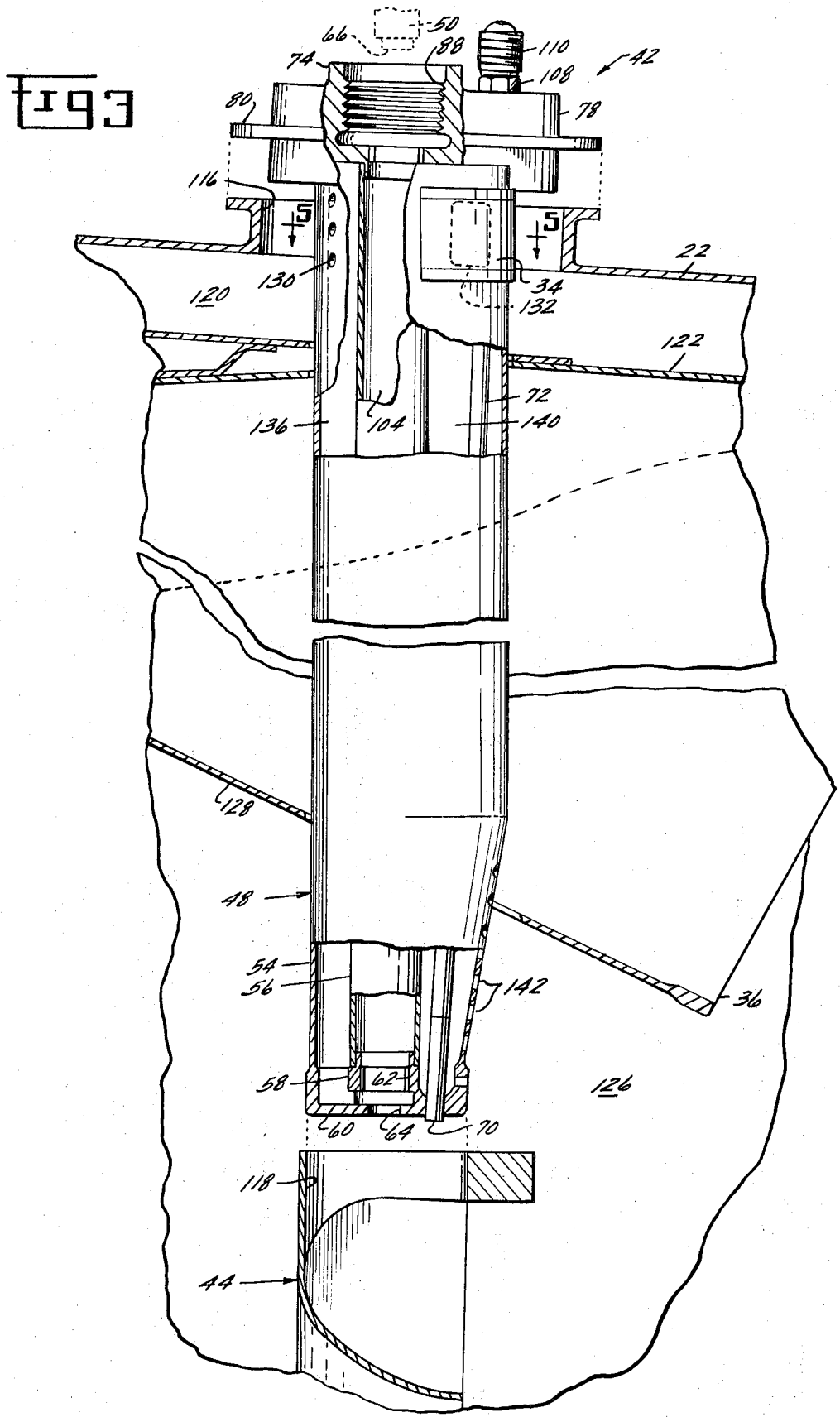

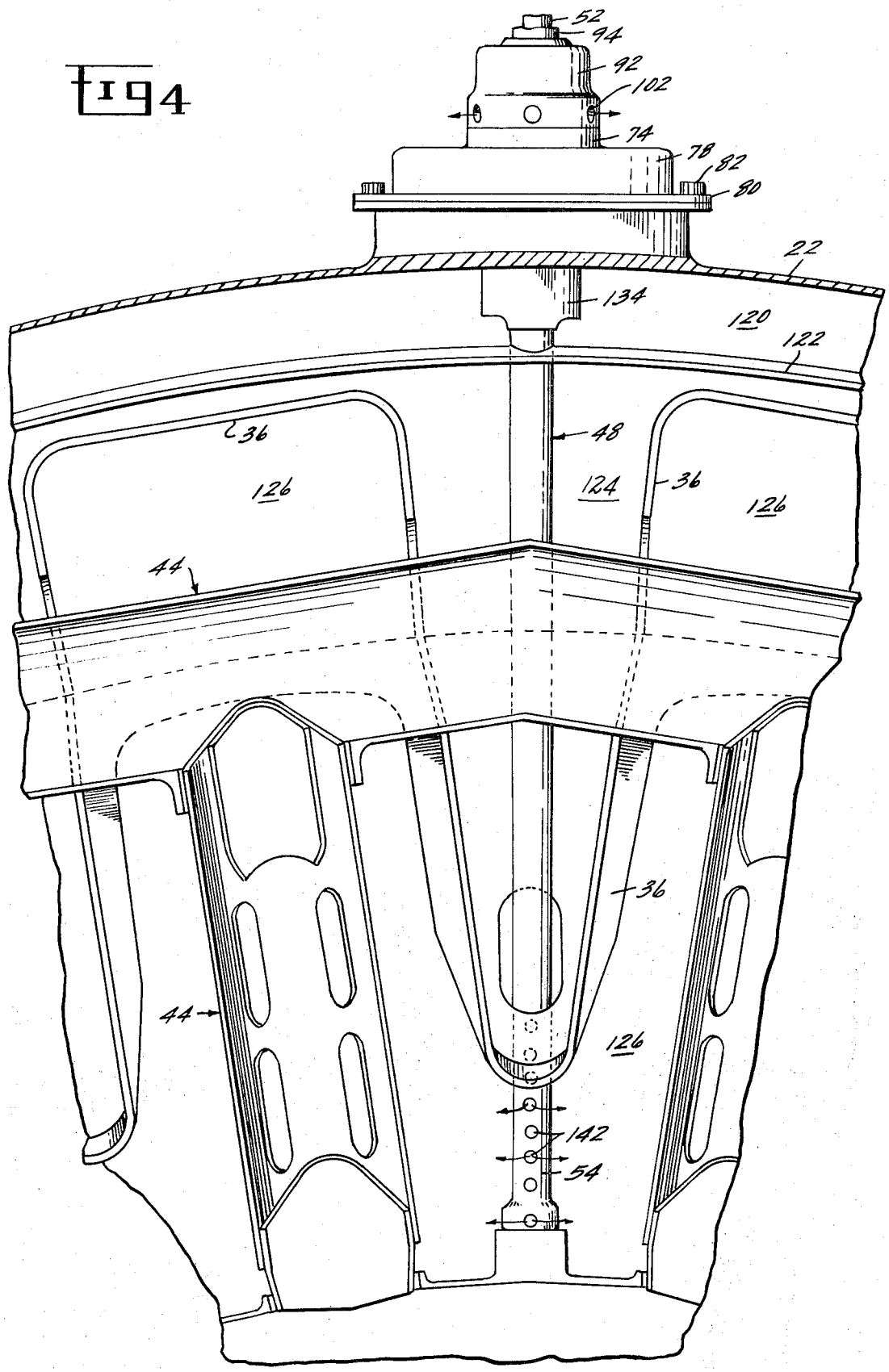

AIR COOLED AUGMENTER IGNITER ASSEMBLY

BACKGROUND OF THE INVENTION

This invention relates generally to gas turbine engine thrust augmenters and, more particularly, to electrical spark-type igniters therefor. The invention herein described was made in the course of or under a contract, or a subcontract thereunder, with the United States Department of the Air Force.

The use of thrust augmenters, or afterburners, has become commonplace on gas turbine engines designed for military applications. The use of an afterburning system has also been considered for supersonic commercial aircraft applications.

Although gas turbine engine main combustion systems have long been ignited by means of direct spark ignition, problems such as excessive temperature, difficulty of alignment of the igniter with a flameholder, and risk of flameholding from the housing which contains the igniter and its electrical lead have, until recently, precluded use of direct spark-type igniters in augmenter systems. Recent developments in the gas turbine engine industry have resulted in the application of augmenter systems to turbofan engines. Such engines are generally characterized by a core engine which generates a hot gas stream and also drives a fan which pressurizes an air stream in a duct, generally concentric with the core engine. Advantageously, the stream emitting from the core engine and the stream from the fan duct are mixed by means of an aerodynamic/mechanical mixer prior to being discharged through an exhaust nozzle to provide the main propulsive force of the engine. When an augmenter is applied to such an engine, burning within the augmenter must take place downstream of the mixer in order to preclude damage thereto. It is desirable, however, to inject the augmenter fuel upstream of the mixer and to use the mixing action to finally disperse the fuel and to provide a more uniform fuel/air mixture prior to its ignition. Thus, in such a design, a combustible fuel/air mixture at turbine discharge temperature is flowing past the igniter housing. At the high temperatures involved, any turbulence in the wake of the igniter housing is quite likely to cause overheating due to flameholding. Means must therefore be provided for preventing or substantially reducing any turbulence in the wake of the igniter housing.

In addition to the above requirements, a suitable electrical spark igniter must include means for cooling the entire igniter and must especially include means for providing effective cooling of the critical igniter tip which, along with the housing is exposed to turbine discharge temperature air.

Another requirement of a suitable augmenter igniter is that the igniter itself must be easily replaced. This requirement exists due to the fact that, no matter how successful the cooling scheme is, the igniter tip eventually wears out in much the same manner that a spark plug wears out and must be replaced in an internal combustion engine. It is desirable, therefore, to provide an augmenter igniter which can be readily disconnected and removed from the augmenter without the necessity of removing the igniter housing or tearing down any portion of the gas turbine engine. Furthermore, means must also be provided to accurately position a new igniter within the igniter housing upon replacement of the old igniter.

SUMMARY OF THE INVENTION

It is an object of this invention, therefore, to provide a long-life, air-cooled, electrical spark-type igniter for a gas turbine engine augmenter, which igniter is easily disconnected and replaced without the necessity of replacing an igniter housing which surrounds the igniter and protrudes into the exhaust gas stream of the gas turbine engine.

Briefly stated, the above and similarly related objects are attained by providing a hollow augmenter igniter housing which includes a number of airflow passages and means for delivering cooling air to these passages. A portion of this cooling air is bled from the housing through a plurality of holes located at the base thereof to reduce local gas temperatures and minimize turbulence in the base area of the housing and to thus preclude flameholding by the housing. The housing includes, at one end thereof, a spherical bushing mount which accommodates misalignment and thermal expansion of the housing and igniter. An igniter, which takes the form of a long cylindrical rod having an igniter tip at one end thereof, is positioned within a centrally disposed cavity which extends the length of the housing. Ths igniter is threadably engaged by the spherical bushing and is spring-loaded into a desired position. When thus assembled, the igniter tip cooperates with the housing to provide a high cooling rate passageway for cooling the igniter tip.

DESCRIPTION OF THE DRAWINGS

While the specification concludes with a series of claims which distinctly claim and particularly point out the subject matter which Applicant regards as his invention, a complete understanding of the invention will be gained from the following detailed description which is given in connection with the accompanying drawings, in which:

FIG. 2 is a longitudinal section, on an enlarged scale with portions removed, of the augmenter igniter assembly portion of the engine;

FIG. 3 is a partially sectional view similar to FIG. 2, with the igniter removed from the housing and with the housing partially removed;

FIG. 4 is a transverse section, with portions removed, taken along line 4—4 of FIG. 1;

DESCRIPTION OF A PREFERRED EMBODIMENT

Figure 1:
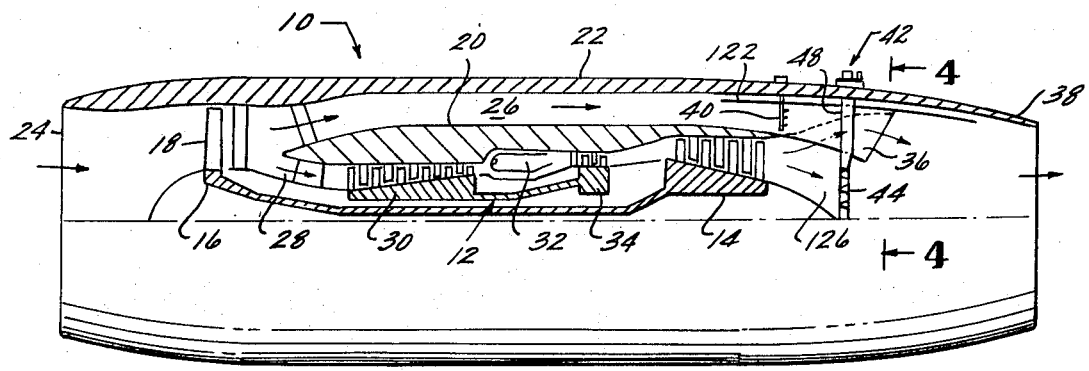
FIG. 1 is a longitudinal section, on a greatly reduced scale, of a simplified turbofan engine embodying the present invention.

Referring now to the drawings wherein like numerals correspond to like elements throughout, attention is directed initially to FIG. 1 in which a turbofan engine 10 is shown to comprise a core engine 12 which generates a hot gas stream for driving a fan turbine 14. The turbine 14 is connected to and drives a rotor 16 of a fan 18 disposed at the inlet end of the engine 10. The core engine 12 and the fan turbine 14 are housed within a nacelle or inner casing 20. An elongated cowl or outer casing 22 defines the engine inlet, indicated at 24, and in combination with the nacelle 20, defines an annular duct 26 concentric with the core engine 12.

In operation, the fan 18 pressurizes an air stream, the outer portion of which passes along the duct 26 and the inner portion of which enters the core engine 12 through a passageway 28. In the core engine, the air stream is further compressed by core engine compressor 30 to provide a highly pressurized air stream for supporting combustion of fuel in a combustor 32. The hot gas stream thus generated drives a high pressure core engine turbine 34 which is connected to the rotor of the compressor 30. The hot gas stream next passes through the fan turbine 14 which, in turn, drives the fan rotor 16 in a well-known manner. The fan stream and the hot gas stream then pass through a mixer 36 in which the two gas streams are thoroughly mixed prior to discharging through an exhaust nozzle 38 to provide thrust for propulsion of an aircraft.

As further shown in FIG. 1, the engine 10 is of the mixed flow augmenter type in that additional fuel is injected into the gas stream and ignited prior to its exiting through the exhaust nozzle 38. For this reason, a plurality of fuel injectors 40 are positioned within the passageway 26 just upstream of the mixer 36. Although modern engines with turbine discharge temperatures in the region of 1,400° to 1,600° F are quite likely to have augmenter autoignition take place, at low burner pressure conditions such as during the operation at high altitude, autoignition cannot be relied upon. For this reason, an igniter assembly 42 is provided and, as shown in FIG. 1, includes components positioned partially within the passageway 26 and partially within the hot gas passage downstream of the fan turbine 14. As further shown, the igniter assembly 42 is located within a portion of the mixer 36 a short distance downstream of the augmenter fuel injectiors 40. Furthermore, the igniter assembly 42 is located in the plane of a flameholder 44, which, as its name implies, provides a sufficient dwell time for the fuel/air mixture to enable complete burning thereof prior to its exiting through the exhaust nozzle 38.

Mixed flow augmenters, such as described above, have the augmenter fuel injected well upstream of the igniter and a combustible mixture at turbine discharge temperature is thus flowing past the igniter. At the high gas temperatures involved, any turbulence in the wake of the igniter is quite likely to cause localized overheating due to flameholding. Overheating of portions of the igniter assembly quite possibly could cause failure thereof, and it is this general problem with which the present invention deals.

Attention is now directed to FIGS. 2 through 6 wherein the details of the inventive igniter assembly 42 are shown. With particular reference to FIG. 2, the igniter assembly 42 is shown to include an electrical spark-type igniter 46 positioned within an igniter housing 48. The igniter 46 includes an igniter tip 50 which provides an electrical spark discharge in a manner well-known in the art. The igniter 46 is provided with a suitable source of power by means of a lead 52.

Figure 5:
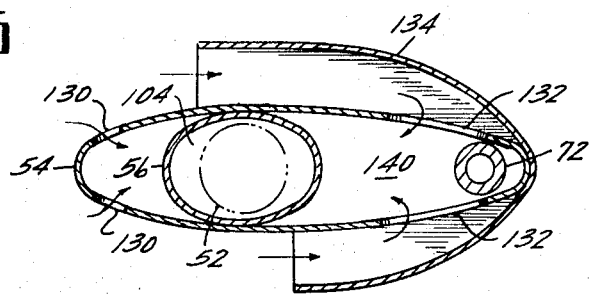
FIG. 5 is a view taken along line 5—5 of FIG. 3.
Figure 6:
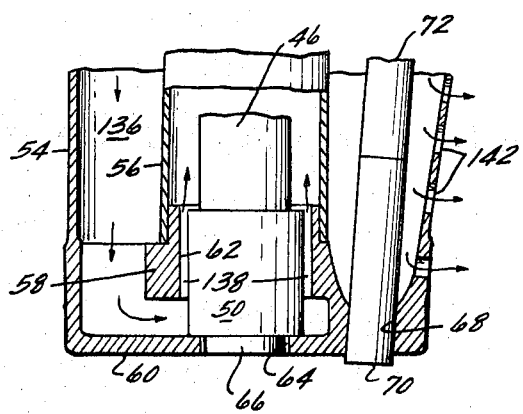
FIG. 6 is an enlarged sectional view of the igniter tip.

The igniter housing 48 includes an outer, generally symmetrical, airfoil-shaped shell 54 as shown in FIGS. 2 and 5. Positioned within the shell 54 is a hollow, elliptical member 56, which provides a central opening for receiving the igniter 46. The elliptical member 56 is accurately positioned within the outer shell 54 in any suitable manner. For example, as shown in FIG. 6, the member 56 rests on and surrounds a collar 58 formed integrally with, and spaced above, a base 60, which forms the bottom of the housing 48. As further shown in FIG. 6, the collar 58 provides an opening 62 for receiving the igniter tip 50, while the base 60 also includes an opening 64 which receives a projecting portion 66 of the igniter tip 50. The base 60 further includes a second opening 68 which receives an orifice tip 70 of a pilot fuel tube 72, which is positioned within the housing 48 between the outer shell 54 and the elliptical member 56. This arrangement is most clearly shown in FIG. 2.

The unique mounting arrangement for the igniter assembly 42 which permits quick replacement of the igniter 46 without the necessity of replacement or disassembly of the housing 48, and which further accommodates the thermal expansion mismatch problem of the igniter assembly, will now be discussed in connection with FIGS. 2 and 3. The top of the shell 54 and of the elliptical member 56 are rigidly connected to a spherical bushing 74. The bushing 74 fits within a collar 76 which permits limited rotation of the bushing 74 in all directions. The collar 76, in turn, is positioned within a cylindrical sleeve 78, which includes a projecting lip 80 for securing the sleeve 78 to the outer casing 22 of the gas turbine engine. The sleeve 78 may be rigidly connected to the casing 22 in any known manner, such as by means of bolts 82.

The collar 76 is positioned within the sleeve 78 on one side thereof by means of a lip 84, which projects inwardly from the sleeve 78 at the top thereof. A combination locking strip and sealing member 86 is provided at the other end of the collar 76 to secure the collar 76 within the sleeve 78 and to preclude the flow of air therebetween.

As further shown in FIGS. 2 and 3, the bushing 74 is provided with a pair of threaded openings 88 and 90, which receive the igniter 46 and the pilot fuel tube 72, respectively. The opening 88 receives a cap nut 92, which surrounds a portion of the lead 52 and is capable of rotation with respect thereto. If desired, an elastomer seal 94 may be positioned between the nut 92 and the lead 52. As shown in FIG. 2, the nut 92 is hollow and thereby provides a chamber 96, which receives a spring 98. The spring 98 is held in position by means of a collar 100, which is physically connected to the lead 52 in any desired manner. The nut 92 is also provided with a number of orifices 102 which permit the flow of air from the chamber 96 to the surrounding atmosphere.

As further shown in FIG. 2, the collar 100 is of smaller diameter throughout its entire length than the diameter of the surrounding bushing 74 or of the nut 92. In this manner, when the nut 92 is assembled as shown in FIG. 2, air can flow from a chamber 104, defined by the inner wall of the elliptical member 56, to the chamber 96 and thus to the surrounding atmosphere through the orifices 102. The flow of air in this manner is further assured by placing the collar 100 on the lead 52 in such a position that an enlarged head portion 106 of the nut 92 abuts the top of the bushing 74 before the collar 100 can come into contact therewith.

Referring still to FIGS. 2 and 3, the pilot fuel tube 72 is positioned within the housing 48 such that the orifice tip 70 is received in the opening 68. The tube 72 is then connected to the housing 48 by means of a nut 108, formed integrally with the tube 72. The nut 108 is threadably received in the opening 90, and as clearly shown in FIG. 3, the nut 108 provides a fitting 110, which accepts a flare nut 112 (FIG. 2) to connect tubing 114 thereto. Fuel is delivered from a suitable supply (not shown) to the pilot fuel tube 72 through the tubing 114.

Assembly of the igniter is carried out in a number of simple steps. For example, the housing 48, with the pilot fuel tube 72 previously assembled therein, is positioned within an opening 116 formed in the outer casing 22 of the engine 10 as shown in FIG. 3. The housing 48 is then connected to the casing 22 by means of the bolts 82. When thus positioned, the base 60 of the housing 48 fits within an opening 118 formed within a portion of the augmenter flameholder 44. The igniter 46 and its lead 52 are then inserted within the chamber 104 formed by the elliptical member 56. The igniter tip 50 then engages the base 60 of the housing 48 and is centered within the opening 62 as the projecting portion 66 of the igniter tip 50 slips within the opening 64 in the base 60. The nut 92 is then torqued against the bushing 74 thus compressing the spring 98 against the collar 100, which is fixed to the lead 52. The spring force thus generated seats the igniter tip 50 firmly against the base 60 of the housing 48.

When completely assembled as described above, the igniter assembly 42, and in particular the housing 48, lies within three separate regions of the gas turbine engine mixer 36 as clearly shown in FIGS. 2 and 4. That is, the top portion of the housing 48 lies within a bypass passageway 120 formed between the outer casing 22 and a cylindrical liner 122 spaced a short distance inwardly therefrom. The midportion of the housing 48 lies within passageway 124, which is an extension of the bypass duct 26 and is formed by the mixer 36 as shown in FIG. 4.

Finally, the bottom portion of the housing 48 lies within hot gas passageway 126, which is an extension of the outlet passage from the turbine 14 and lies on the opposite side of the mixer 36 from the cold air passage 124. The mixer 36, as is well known in the art, operates to more thoroughly mix the hot air within the passage 126 with the cold air within the passage 124. At the location of the housing 48, however, this mixing has not yet completely taken place and that portion of the housing 48 which lies beneath a wall 128 (FIG. 2), forming the bottom of one of the chutes of the mixer 36, is exposed to the hot gas exiting from the turbine 14. For this reason, cooling air must be supplied to the interior of the housing 48 to prevent localized overheating of the igniter 46 and of other components of the igniter assembly 42.

The cooling air is delivered to the interior of the housing 48 by means of a number of cooling air holes 130 formed within the outer shell 54 in such a position that they lie within the passageway 120 when the igniter assembly 42 is fully assembled as shown in FIG. 2. Similarly, two larger air holes 132 are provided on opposite sides of the housing 48 in the outer shell 54 downstream of the air holes 130. The air holes 132 are also positioned such that they lie within the passageway 120 when the housing 48 is properly assembled. To assure that sufficient cooling air is delivered from the passageway 120 to the cooling air holes 132, an air scoop 134 is provided around that portion of the shell 54 which lies within the passageway 120 as shown most clearly in FIGS. 4 and 5.

Referring now to FIGS. 2 and 5, air flowing from the passageway 120 through the air holes 130 is delivered to a first cooling passageway 136 formed between the outer shell 54 and the upstream portion of the elliptical member 56. This cooling air flows through the passageway 136 in the direction of the arrows of FIG. 2 until it reaches the base 60 of the housing 48. At that point, the cooling air turns as shown in FIG. 6 and flows through a small passageway 138 formed between the igniter tip 50 and the opening 62 within the collar 58. Air flowing through the passageway 138 is accelerated and thus very effectively cools the critical igniter tip 50. This air then flows radially outwardly through the chamber 104 and cools the remainder of the igniter 46 and its electrical lead 52. After performing its cooling function, this air flows through the nut 92, as previously described, and exits through the orifices 102 to the surrounding atmosphere.

The cooling air which enters the cooling air slots 132 flows radially inwardly as shown in FIG. 2 through a passageway 140 formed between the outer shell 54 and the downstream portion of the elliptical member 56. This cooling air initially cools the shell 54, the elliptical member 56 and the pilot fuel tube 72. After performing this function, the cooling air exits through a row of exit holes 142 formed in that portion of the downstream end of the shell 54 which lies within the hot gas passageway 126. This arrangement is clearly shown in FIGS. 2 and 4. The cooling air exiting from the holes 142 not only cools the bottom portion of the housing 48, but also locally reduces the fuel/air mixture and gas temperature downstream of the housing. Furthermore, the air substantially reduces the wake which would otherwise form downstream of the housing 48, thereby substantially eliminating tendencies of the housing 48 to hold the flame caused by burning of the augmenter fuel/air mixture.

As described above, Applicant has provided an extremely reliable, long-life, electrical spark igniter for a mixed flow augmenter gas turbine engine. The inventive igniter assembly isolates the igniter 46 and its electrical lead 52 from high temperature gases and cools the igniter, with particularly effective cooling taking place in the region of the critical igniter tip 50. The assembly further prevents overheating and failure of the igniter housing 48 by substantially reducing the tendency of the housing to hold the augmenter flame.

Furthermore, the igniter assembly 42 provides for extremely simple replacement of the igniter and its electrical lead without the necessity of removing the augmenter igniter housing 48. That is, the igniter may be removed and replaced simply by removing the nut 92 and thereafter positioning a replacement igniter and its associated nut within the semi-permanently connected housing 48. Finally, the igniter assembly accurately positions the igniter within the flameholder 44 in spite of the inherently poor alignment which exists between the augmenter duct and the flameholder gutters as a result of thermal expansion and thermal distortion during operation of the augmenter. The spherical bushing 74 which provides for the accurate positioning of the igniter also accommodates any resulting thermal mismatch during operation of the augmenter.

What I claim is:

1. An augmenter igniter assembly for a gas turbine engine having an engine casing associated therewith, said engine casing comprising an outer liner and an inner wall portion; a relatively hot gas stream flowing within said inner wall portion, and a relatively cool gas stream flowing between said liner and said inner wall portion; and means for injecting fuel into said hot gas stream; said assembly comprising a hollow housing including a first part adapted to extend into said hot gas stream associated with said engine, a second part adapted to extend into said relatively cool gas stream associated with said engine, an electrical discharge-type igniter adapted to be positioned within said housing, means for delivering cooling air to the interior of said housing to cool said igniter, and said housing including means for exhausting at least a portion of said cooling air along substantially the entire length of said first part of said housing as antiflameholding air said cooling air exhausting means comprising a plurality of holes spaced along substantially the entire length and proximate the trailing edge of said first part of said housing.

2. The igniter assembly recited in claim 1 further including means for mounting said housing to said engine casing, said mounting means including a spherical bushing permitting partial rotation of said housing with respect to the engine casing, said mounting means further including means for removably connecting said igniter to said housing, said connecting means including a threaded opening in said bushing for receiving said igniter thereby enabling the removal of said igniter from said housing without the necessity of removing said housing from the engine casing.

3. The igniter assembly recited in claim 2 wherein said housing includes a base portion and said base portion includes an opening for receiving a tip portion of said igniter.

4. The igniter assembly recited in claim 3 wherein said igniter connecting means further includes means for spring-loading said igniter tip portion against said base portion of said housing.

5. The igniter assembly recited in claim 1 wherein said housing includes an outer shell member and an inner member, said shell member and said inner member cooperating to define a plurality of radial cooling paths within said housing, said outershell member having said plurality of exit holes located therein.

6. The igniter assembly recited in claim 5 wherein said inner member includes a collar near the bottom thereof for receiving said igniter tip portion, said collar defining a high velocity cooling path around said igniter tip portion.

7. The augmenter igniter assembly recited in claim 6 wherein said outer shell member has a generally symmetrical airfoil-shaped cross section and said means for delivering cooling air include first air inlet means in said shell member near the leading edge thereof adapted to deliver cooling air to a first of said radial cooling paths and second air inlet means in said shell member near the trailing edge thereof adapted to deliver cooling air to a second of said radial cooling paths and thereafter to said antiflameholding exit holes.

8. The igniter assembly recited in claim 7 further including means for mounting said housing to an engine casing, said mounting means including a spherical bushing permitting partial rotation of said housing with respect to the engine casing.

9. The igniter assembly recited in claim 8 further characterized in that said housing includes a base portion, which includes an opening for receiving a tip portion of said igniter, and said mounting means further includes means for spring-loading said igniter tip portion against said base portion of said housing.

10. The igniter assembly recited in claim 9 wherein said mounting means further includes means for removably connecting said igniter to said housing, said connecting means enabling the removal of said igniter from said housing without the necessity of removing said housing from the engine casing.

11. The igniter assembly recited in claim 10 wherein said connecting means includes a hollow nut, said spherical bushing includes a threaded opening for receiving said nut, said igniter includes an electrical lead extending from said igniter through said hollow nut, and said spring-loading means includes a collar rigidly connected to said igniter lead and a spring located between said nut and said collar.

12. The igniter assembly recited in claim 11 in combination with an augmented gas turbine engine, said engine including a compressor, a primary combustion system, a turbine and an augmenter combustion system, said augmenter combustion system including a flameholder, and said flameholder including an opening therein for slideably receiving said base portion of said housing.

13. A mounting assembly for a gas turbine engine augmenter igniter, which includes an electrical spark-type igniter tip, and a hollow housing surrounding said igniter and igniter tip and defining a cooling flow path therearound, said mounting assembly including means for mounting said housing to an engine casing, said mounting means including a spherical bushing permitting slight rotation of said housing with respect to the engine casing, and means for removably connecting said igniter to said housing, said connecting means including a threaded opening within said spherical bushing thereby enabling the removal of said igniter from said housing without the necessity of removing said housing from the engine casing.

14. The mounting assembly recited in claim 13 wherein said housing includes a base portion and said base portion includes an opening for receiving said igniter tip and said mounting means includes means for spring-loading said igniter tip against said base portion of said housing.

15. The mounting assembly recited in claim 14 wherein said connecting means includes a hollow nut and said threaded opening receives said hollow nut.

16. The mounting assembly recited in claim 15 wherein said spring-loading means includes a collar rigidly connected to said igniter lead and a spring located between said nut and said collar, said igniter further including pilot fuel delivery tubing adapted to be positioned within said housing, and said mounting assembly includes means for removably connecting said tubing to said spherical bushing.

* * * * *